(12) United States Patent
Prieto et al.

(10) Patent No.: US 7,773,672 B2
(45) Date of Patent: Aug. 10, 2010

(54) SCALABLE RATE CONTROL SYSTEM FOR A VIDEO ENCODER

(75) Inventors: Yolanda Prieto, Miami, FL (US); Zhongli He, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 294 days.

(21) Appl. No.: 11/421,007

(22) Filed: May 30, 2006

(65) Prior Publication Data

US 2007/0280349 A1 Dec. 6, 2007

(51) Int. Cl.
*H04N 7/12* (2006.01)
*H04N 11/02* (2006.01)
*H04N 11/04* (2006.01)

(52) U.S. Cl. .............................. 375/240.03; 375/240.1; 375/240.11

(58) Field of Classification Search ............ 375/240.03, 375/240.1, 240.11
See application file for complete search history.

(56) References Cited

U.S. PATENT DOCUMENTS

| | | | | |
|---|---|---|---|---|
| 5,231,484 A * | 7/1993 | Gonzales et al. | ....... | 375/240.04 |
| 5,270,813 A | 12/1993 | Puri et al. | | |
| 5,414,469 A * | 5/1995 | Gonzales et al. | ....... | 375/240.18 |
| 5,555,244 A | 9/1996 | Gupta et al. | | |
| 5,565,920 A * | 10/1996 | Lee et al. | ............... | 375/240.11 |
| 5,673,265 A | 9/1997 | Gupta et al. | | |
| 5,740,176 A | 4/1998 | Gupta et al. | | |
| 5,799,017 A | 8/1998 | Gupta et al. | | |
| 5,864,542 A | 1/1999 | Gupta et al. | | |
| 6,115,689 A | 9/2000 | Malvar | | |
| 6,160,846 A * | 12/2000 | Chiang et al. | .......... | 375/240.05 |
| 6,192,154 B1 | 2/2001 | Rajagopalan et al. | | |
| 6,208,688 B1 | 3/2001 | Seo et al. | | |
| 6,212,232 B1 * | 4/2001 | Reed et al. | ............. | 375/240.03 |

(Continued)

FOREIGN PATENT DOCUMENTS

EP 0736843 10/1996

(Continued)

OTHER PUBLICATIONS

Julien Reichel, Heiko Schwarz and Mathias Wien; Joint Scalable Video Model JSVM-5; 18th Meeting: Bangkok, Thailand, Jan. 14-20, 2006. pp. 1-43.

(Continued)

*Primary Examiner*—Marsha D Banks Harold
*Assistant Examiner*—Chikaodili E Anyikire
(74) *Attorney, Agent, or Firm*—Gary R. Stanford

(57) ABSTRACT

A rate control system for a video encoder including rate control logic which determines a first QP corresponding to a selected encoding layer of multiple encoding layers, and scaling logic configured to scale the first QP to a second QP corresponding to any other encoding layer based on at least one encoding layer parameter. A template of stored QP values may be used to reduce computational complexity, such as a QP value for each frame interval or a QP value for each of multiple rate control interval complexity values. The QP values in the template may be predetermined or programmed and updated during periodic training sessions. Several encoding layer parameters are contemplated, such as any combination of bit rate, frame rate and frame resolution. The scaling logic may be configured to scale from any one encoding layer to another and vice-versa for bi-directional scaling.

19 Claims, 4 Drawing Sheets

U.S. PATENT DOCUMENTS

| | | | |
|---|---|---|---|
| 6,215,820 | B1 | 4/2001 | Bagni et al. |
| 6,272,151 | B1 | 8/2001 | Gupta et al. |
| 6,292,512 | B1 | 9/2001 | Radha et al. |
| 6,343,098 | B1 * | 1/2002 | Boyce .................. 375/240.03 |
| 6,351,491 | B1 * | 2/2002 | Lee et al. ............... 375/240.03 |
| 6,366,704 | B1 | 4/2002 | Ribas-Corbera et al. |
| 6,532,263 | B2 | 3/2003 | Radha et al. |
| 6,603,883 | B1 | 8/2003 | Hamanaka |
| 6,823,008 | B2 | 11/2004 | Morel |
| 6,836,512 | B2 | 12/2004 | Van Der Schaar et al. |
| 2002/0021754 | A1 | 2/2002 | Pian et al. |
| 2002/0021756 | A1 | 2/2002 | Jayant et al. |
| 2002/0122482 | A1 | 9/2002 | Kim et al. |
| 2003/0072364 | A1 | 4/2003 | Kim et al. |
| 2003/0123539 | A1 | 7/2003 | Kim et al. |
| 2003/0152151 | A1 | 8/2003 | Hsieh et al. |
| 2003/0215011 | A1 * | 11/2003 | Wang et al. ............ 375/240.03 |
| 2004/0037357 | A1 | 2/2004 | Bagni et al. |
| 2004/0057516 | A1 | 3/2004 | Kim et al. |
| 2004/0146103 | A1 | 7/2004 | Chang et al. |
| 2005/0036544 | A1 | 2/2005 | Webb et al. |
| 2005/0058198 | A1 | 3/2005 | Zhao et al. |
| 2005/0169370 | A1 * | 8/2005 | Lee ....................... 375/240.03 |

FOREIGN PATENT DOCUMENTS

| | | |
|---|---|---|
| EP | 1315380 | 5/2003 |
| EP | 0857394 | 7/2003 |
| EP | 1086593 | 7/2003 |
| WO | WO02096120 | 11/2002 |
| WO | WO2004045218 | 5/2004 |

OTHER PUBLICATIONS

Ma et al. "Rate Control for JVT Video Coding Scheme with HRD Considerations." Institute of Computing Technology, Chinese Academy of Science, Beijing. 2003 IEEE. pp. 1-4.

Lee et al. "Scalable Rate Control for MPEG-4 Video." IEEE Transactions on Circuits and Systems for Video Technology, vol. 10, No. 6. Sep. 2000. pp. 878-894.

Kim et al. "Real-Time Frame-Layer Rate Control for Low Bit Rate Video over the Internet." IEICE Trans, Commun., vol. E87-B, No. 3, Mar. 2004. pp. 598-604.

Kim et al. "Efficient Real-Time Frame Layer Rate Control Technique for Low Bit Rate Video over WLAN" pp. 1-8.

Ribas-Corbera et al. "Rate Control in DCT Video Coding for Low-Delay Communications." IEEE Transactions on Circuits and Systems for Video Technology. vol. 9, No. 1, Feb. 1999, pp. 172-185.

Vetro et al. "MPEG-4 Rate Control for Multiple Video Objects." IEEE Transactions on Circuits and Systems for Video Technology. vol. 9, No. 1, Feb. 1999. pp. 186-199.

Ribas-Corbera et al. "Rate Control for Low-Delay Video Communications." Sharp Labs of America Study Group 16, Jun. 24-27, 1997. pp. 1-27.

* cited by examiner

| FRAME INTERVAL | QP |
|---|---|
| INT1 | QP1 |
| INT2 | QP2 |
| INT3 | QP3 |
| ⋮ | ⋮ |

| LOW MOTION | | |
|---|---|---|
| MAD 1.1X | TBPP | QP |
| 256 | 0.168 | 12 |
|  | 0.337 | 10 |
|  | 0.673 | 8 |
| 282 | 0.168 | 13 |
|  | 0.337 | 11 |
|  | 0.673 | 9 |
| ... | ... | ... |

— 302

| MEDIUM MOTION | | |
|---|---|---|
| MAD 1.15X | TBPP | QP |
| 1024 | 0.168 | 30 |
|  | 0.337 | 28 |
|  | 0.673 | 26 |
| 1178 | 0.168 | 31 |
|  | 0.337 | 29 |
|  | 0.673 | 27 |
| ... | ... | ... |

— 303

| HIGH MOTION | | |
|---|---|---|
| MAD 1.25X | TBPP | QP |
| 2048 | 0.168 | 40 |
|  | 0.337 | 38 |
|  | 0.673 | 36 |
| 2560 | 0.168 | 42 |
|  | 0.337 | 40 |
|  | 0.673 | 38 |
| ... | ... | ... |

300

FIG. 3

# SCALABLE RATE CONTROL SYSTEM FOR A VIDEO ENCODER

BACKGROUND OF THE INVENTION

1. Field of the Invention

The present invention relates in general to video encoding, and more specifically to a scalable rate control system for a video encoder.

2. Description of the Related Art

Video standards are continuously being improved or otherwise replaced to improve performance and quality for a variety of applications. For example, the Advanced Video Coding (AVC) standard, Part 10 of MPEG4 (Motion Picture Experts Group), otherwise known as H.264, includes advanced compression techniques that were developed to enable transmission of video signals at a lower bit rate or to enable improved video quality at a given transmission rate. The H.264 standard is used for exemplary embodiments of the present invention although it is understood that the present invention is not limited to H.264 and is applicable to other video standards. The newer standard outperforms video compression techniques of prior standards in order to support higher quality streaming video at lower bit rates and to enable internet-based video and wireless applications and the like. The standard defines the syntax of the encoded video bit stream along with a method of decoding the bit stream. Each video frame is subdivided into one or more slices and encoded at the macroblock (MB) level, where each MB is a 16×16 block of pixels. The size of each slice is arbitrary and may range between a single MB up to all of the MBs in the frame. Each frame is also subdivided according to a rate control interval, specified as a number of MBs per interval, where the rate control interval also ranges between a single MB up to all of the MBs in the frame. The slice size and rate control interval size may be, but are not necessarily, the same.

Furthermore, newer video and image codec standards are being developed to enable video systems having a wide range of computational capabilities to seamlessly process various frame rates, image resolutions, system bandwidth and bit rates in a heterogeneous environment. Scalable Video Coding (SVC), for example, is an extension of the H.264 main profile which addresses coding schemes for reliably delivery of video to diverse clients over heterogeneous networks using available system resources, particularly in scenarios where the downstream client capabilities, system resources, and network conditions are not known in advance, or dynamically changing from time to time. SVC achieves scalability by using a base- and an enhance-layer concept, where the enhanced layer is scalable from the base layer, and the rate control interval of base layer is scaled up too for spatial scalability. The base layer should be the simplest form in quality, spatial- and temporal-resolution. Whereas H.264 has relatively limited scalability, SVC provides multiple levels of scalability including temporal scalability, spatial scalability, complexity scalability and quality scalability. Temporal scalability generally refers to the number of frames per second (fps) of the video stream, such as 7.5 fps, 15 fps, 30 fps, etc. Spatial scalability refers to the resolution of each frame, such as common interface format (CIF) with 352 by 288 pixels per frame, or quarter CIF (QCIF) with 176 by 144 pixels per frame, although other spatial resolutions are contemplated, such as QVGA, VGA, SVGA, D1, HDTV, etc. Complexity scalability generally refers to the various computational capabilities and processing power of the devices processing the video information. Quality scalability is generally measured with a peak signal-to-noise (PSNR) metric defining the relative quality of a reconstructed image compared with an original image. Quality scalability is varied with the applicable bit rate, such as 64 kilobits per second (kbps), 128 kbps, 256 kbps, 512 kbps, etc.

One of the primary functional blocks within a video encoder for addressing scalability is the rate controller. It is desired to provide an efficient rate controller which is capable of generating a quality image in a heterogeneous and seamless environment in which devices with various processing capabilities demand scalable bit rates, image resolutions, and frame rates.

BRIEF DESCRIPTION OF THE DRAWINGS

The benefits, features, and advantages of the present invention will become better understood with regard to the following description, and accompanying drawings where:

FIG. 2 is a diagram of a template implemented according to one embodiment of the present invention which may be used as the template of the rate control system of FIG. 1;

FIG. 3 is a diagram of a template implemented according to another embodiment of the present invention which may be used as the template of the rate control system of FIG. 1;

DETAILED DESCRIPTION

The following description is presented to enable one of ordinary skill in the art to make and use the present invention as provided within the context of a particular application and its requirements. Various modifications to the preferred embodiment will, however, be apparent to one skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

Figure 1:
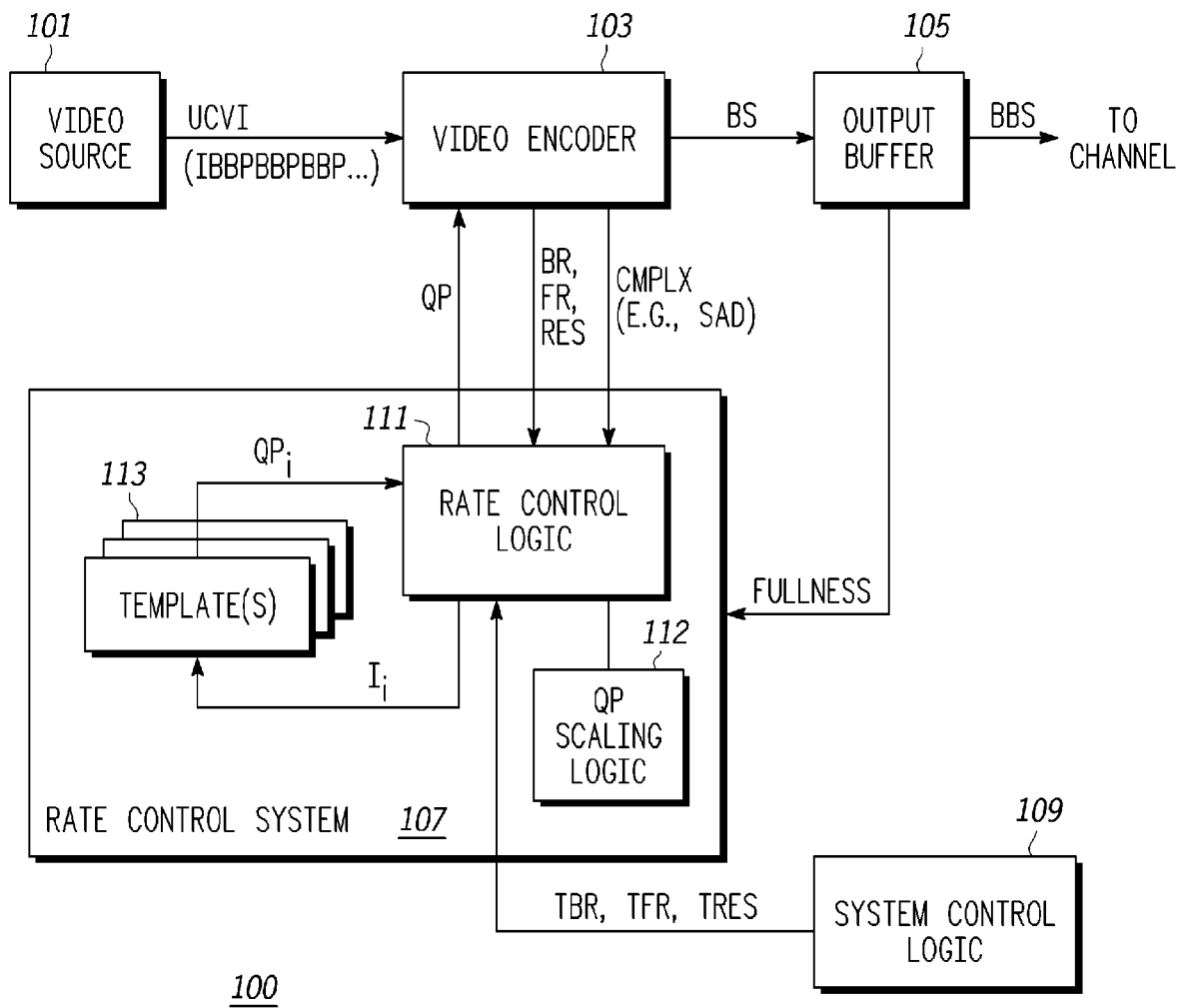
FIG. 1 is a block diagram of a video encoder system implemented according to an exemplary embodiment of the present invention.

FIG. 1 is a block diagram of a video encoder system 100 implemented according to an exemplary embodiment of the present invention. A video source 101 provides uncompressed video information (UCVI) to a video encoder 103, which encodes the UCVI and provides a compressed video bit stream (BS) at its output. The video encoder 103 is implemented according to H.264, or as extended according to the proposed SVC extension, where it is understood that the present invention is applicable to other video encoders implemented according to different standards or proprietary codecs (coder/decoders) including future codecs yet to be developed. The UCVI is shown as a stream of MPEG frame types IBBPBBPBBP . . . , including I frames, B frames, P frames, etc., as understood by those skilled in the art. It is noted that the B frames might not be used for real-time, low delay applications since bidirectional prediction causes extra coding delay. Additional frame types are supported and the particular ordering of the video source information may be modified as understood by those skilled in the art. The bit stream BS is provided to an output buffer 105, which provides a buffered bit stream (BBS) for transmission via a channel. The relative fullness level of the output buffer 105 is indicated by a buffer fullness signal FULLNESS provided from the output buffer 105 to a rate control system 107. Although the bit stream BS may be provided to a storage device (not shown) for later viewing or transmission, the video encoder system 100 is particularly configured for real-time visual communication in which the buffered bit stream BBS is transmitted via the channel at a specified constant bit rate with very low or minimal delay.

A system control block 109 is shown which monitors various parameters and constraints associated with the channel, computational capabilities of the video encoder system 100, demands by the users, etc., and establishes target parameters to provide a concomitant quality of video suitable for the specified constraints or based on the channel conditions. Each of the target parameters are scalable and may be adjusted from time to time depending upon the specified constraints. The relative quality of the video, measured by the PSNR metric, is controlled by the bit rate (BR) of the bit stream BS, and the system control block 109 provides a target bit rate (TBR) to meet a certain video quality level. Typical target bit rates are 64 kbps, 128 kbps, 256 kbps, 384 kbps, 512 kbps, etc. The system control block 109 provides a target temporal resolution in the form of a target frame rate (TFR), such as 7.5 fps, 15 fps, 30 fps, etc. The system control block 109 provides a spatial resolution in the form of a target frame resolution (TRES) indicative of the pixel resolution of each frame, such as common interface format (CIF) with 352 by 288 pixels per frame, or quarter CIF (QCIF) with 176 by 144 pixels per frame, along with other spatial resolutions including VGA, SVGA, D1, HDTV, etc. The TBR, TFR and TRES values are provided to the rate control system 107.

The rate control system 107 monitors and controls the video encoder 103 and the output buffer 105 to maintain the TBR, TFR and TRES values. The video encoder 103 performs quantization during the encoding process as understood by those skilled in the art, in which quantization is determined and controlled by the quantization parameter (QP) provided by the rate control system 107. The larger the value of QP, the larger the quantization step size applied to the transform coefficients and thus the lower the visual quality of the encoded information. The rate control system 107 operates according to a rate control interval, which is specified as a number of macroblocks per interval. Each frame of input video is divided into a specified number of macroblocks, and the size of the rate control interval is an arbitrary number that ranges between a single macroblock up to all of the macroblocks in each frame. In the illustrated embodiment, the rate control system 107 includes rate control logic 111, QP scaling logic 112 and one or more templates, shown collectively as a template 113. During the encoding process, the video encoder 103 provides the actual encoded bit rate (BR), the actual frame rate (FR), and the actual spatial resolution of the frames (RES) to the rate control logic 111. The video encoder 103 also provides frame complexity information (CMPLX) indicating the relative complexity of each macroblock that has been encoded. In one embodiment, the CMPLX information is provided as a sum of absolute difference (SAD) value for each macroblock. As understood by those skilled in the art, a minimum SAD value is determined during encoding based on a comparison of information between the current frame and a previously encoded frame for each macroblock during motion estimation. The rate control logic 111 provides and updates the QP for each frame interval to be encoded by the video encoder 103 based on the information provided by the TBR, BR, TFR, FR, TRES, RES and CMPLX values.

The rate control logic 111 adjusts QP at the picture or frame level (i.e., for each frame), and at the interval level (i.e., for each rate control interval of each current frame) to maintain the TBR, TFR and TRES indicated by the system control logic 109. In conventional configurations, the rate control logic 111 calculates each QP provided to the video encoder 103 according to a predetermined, non-template based algorithm. In the illustrated embodiment, the template 113 stores predetermined QP values that are accessed by the rate control logic 111 to predict the QP value to be provided to the video encoder 103. The template 113 is either determined apriori for different motion types and stored in memory, or it is computed in real time. As shown, the rate control logic 111 provides an index value $I_i$ to the template 113, which outputs a corresponding $QP_i$ value provided back to the rate control logic 111. In one embodiment, each template 113 is configured as a lookup table (LUT) or the like in which the subscript "i" denotes the particular index value for addressing the LUT, which provides the $QP_i$ value corresponding to that index value. The template 113 is configured according to any one of several different formats, such as those further described below, and the information provided by within the index value $I_i$ depends upon the particular type of template. In one embodiment, a single template is included. Alternatively, multiple templates are included such as predetermined templates for low, medium and high motion video sequences as further described below.

The template 113 may be fixed or programmable, and thus is either programmed, micro-coded, or hardwire coded. If the template 113 is fixed, the QP values stored within are not further programmed or updated. A fixed configuration may be suitable for low complexity devices with limited processing capabilities in which a QP value is simply retrieved from the template 113 and provided to the video encoder 103 without further modification. Although a fixed-template configuration provides relatively low accuracy, it has the advantage of significantly reduced computation complexity of the video device. Alternatively, the template 113 is programmable so that each QP value may be used directly or adjusted in real-time and/or during training sessions as further described below. In a simple, low accuracy embodiment, the $QP_i$ value from the template 113 is forwarded directly to the video encoder 103 without modification or scaling (e.g., $QP=QP_i$). Alternatively, each $QP_i$ value retrieved from the template 113 is adjusted or scaled based on bit budget and allocated bits to achieve a greater level of accuracy. In any of these cases, the change of the QP value from one iteration to the next, or deltaQP=$QP_i$−$QP_{i-1}$, is typically capped within a narrow range (e.g., +/−2 or 3) to avoid a depreciation of visual quality.

The QP scaling logic 112 is provided for scaling the QP value retrieved from the template 113 or otherwise calculated by the rate control logic 111. The QP values stored in the template 113 generally correspond to one of multiple encoding layers, where each encoding layer is determined by a combination of the bit rate (e.g., kbps of BS), the temporal resolution (e.g., fps of BS), and the spatial resolution (e.g., frame size). In one embodiment, for example, the QP values stored in the templates 113 correspond to a lowest layer encoding performed by the video encoder 103, generally referred to as the base layer. The actual encoding parameters of the base layer depends on the particular configuration. As an example, in one embodiment, the base layer corresponds to a QCIF spatial resolution, a frame rate of 30 fps, and a bit rate of 64 kbps. If any of these parameters are increased, then encoding is performed at an enhanced layer relative to the base layer. The QP value is scaled to new value that is appropriate for the enhanced layer. As described further below, the QP scaling logic 112 determines a QP offset and adds (or subtracts) the QP offset to (from) the determined QP value to provide the scaled QP value suitable for the appropriate enhanced layer. The QP offset is based on quality, spatial, or temporal scalability, or any combination thereof. Furthermore, scaling is bidirectional, such that if any of the operational parameters (spatial resolution, temporal resolution, bit rate or quality) is decreased, the QP value is scaled from a higher layer to a lower layer.

FIG. 2 is a diagram of a template 200 implemented according to one embodiment of the present invention which may be used as the template 113 of the rate control system 107. As shown, the template 200 is a single template listing frame intervals INT1, INT2, INT3, . . . , and corresponding QP values QP1, QP2, QP3, . . . . In this manner, the index value $I_i$ provided to the template 200 is simply an interval number within a frame. In one embodiment, the template 200 is programmable and stores programmed QP values for each interval of a single frame of video information. During a training session, the rate control logic 111 calculates a QP value for each encoded interval of a current frame (e.g., a first non-I frame in the video sequence) and stores the QP values in the template 200 (such as during an initial training session). The QP values stored in the template 200 are then used for corresponding intervals for one or more subsequent frames in the video sequence, such as, for example, the next 10 frames. As an example, the QP value stored for an interval of the frame determined during the training session is used for the corresponding interval (e.g., same relative location within the frame) for each subsequent frame. After a predetermined number of frames, or if and when the video content of the video sequence changes by a significant amount (e.g., scene change as determined by the complexity information CMPLX), the rate control logic 111 performs a new training session to update the template 200. Each QP value retrieved from the template 200 is either used without modification or may be further modified depending upon the particular configuration. The average number of frames between training sessions is determined according to a trade-off between video quality and requisite video processing for calculating QP values.

In an alternative embodiment, the template 200 includes multiple templates (not shown), including a first template storing QP values for relatively low motion, a second template including QP values for medium motion video, and the third template including QP values relatively high motion video. In this manner, the index value $I_i$ provided to the template 200 includes information specifying the motion type (low, medium, high) and the interval number of a given frame or video sequence. In one embodiment, the first template stores actual QP values calculated for multiple frames of a predetermined low motion video sequence, the second template stores actual QP values calculated for multiple frames of a predetermined medium motion video sequence, and the third template stores actual QP values calculated for multiple frames of a predetermined high motion video sequence. Any suitable number of frames is contemplated for each video sequence, such as on the order of 500-1,000 to provide a suitable amount of information. As described previously, the QP values may be pre-stored and fixed and thus non-programmable. In an alternative embodiment, each template is programmable and thus may be updated in real-time or during one or more training sessions as further described below.

FIG. 3 is a diagram of a template 300 implemented according to another embodiment of the present invention which may be used as the template 113 of the rate control system 107. As shown, the template 300 includes multiple templates 301, 302 and 303 corresponding to low medium and high motion video sequences in a similar manner as described above. Each of the templates 301-303 is indexed according to a certain picture/content complexity measurement, such as the mean of SAD values for a given frame interval (MAD), and a target bits per pixel (TBPP) value. For example, the minimum SAD values determined while encoding each interval of a frame are averaged to achieve a corresponding MAD value for that interval. The TBPP value is determined based on TBR, TFR and the spatial resolution of each frame according to the following equation (1):

$$TBPP = \frac{TBR}{\text{pic\_width} * \text{pic\_height} * TFR} \quad (1)$$

where pic_width and pic_height are defined as the number of pixels per frame according to the spatial resolution of each frame (e.g., 176 by 144 pixels per frame for QCIF, where pic_width=176 and pic_height=144). It is noted that each TBPP value is a fractional value, which may be scaled by multiplying by an appropriate scaling factor (e.g., 1024). In this case, the index value provided by the rate control logic 111 includes a MAD value and a TBPP value, and the template 300 provides the corresponding $QP_i$ value. Thus, for example, a MAD value of 256 and a TBPP value of 0.168 yields a QP value of 12 from the low motion template 301.

In the illustrated embodiment, the low motion template 301 is indexed by MAD values separated by 10% from one value to the next, or a step factor of 1.10×. Thus, for example, the second value 286 is 10% greater than the first value 256 or 282=1.1*256 (where an asterisk "*" denotes multiplication). Also, the MAD values for the medium motion template 302 are stepped by a factor of 1.15 (1.15×, or 15%) and the MAD values for the high motion template 303 are stepped by a factor of 1.25 (1.25×, or 25%). In this manner, each MAD value is linearly and uniformly increased from one value to the next for each motion video level. In one embodiment, the MAD values overlap from one template to the next, in which case operation remains in one template until the MAD value falls outside the current template. Alternatively, the MAD values are unique for each template so that the MAD value alone determines which template to use. In this latter embodiment, although three separate templates 301-303 are shown, they may be configured as a single, larger template 300. In one embodiment, the template 300 is fixed and non-programmable and in another embodiment, the template 300 is programmable so that the QP values may be updated in real-time or during training sessions.

For the programmable embodiments, the QP values are either updated in real-time after each template access, or are updated periodically after a predetermined number of frames, or a combination of both of these methods. In one real-time programmable embodiment, each QP is incremented or decremented by a particular amount (e.g., by 1) based on a comparison of the TBPP value with the actual number of bits per pixel determined during the encoding process. For example, for MAD=1024 and TBPP=0.168, a QP value of 30 is retrieved from the template 301. If the actual number of bits per pixel after encoding the interval is greater than TBPP by more than a predetermined amount, such as by more than a 15% difference, then QP is incremented by one from 30 to 31. The new QP value (e.g., 31) is then stored within the template 301 replacing the old QP value (e.g., 30) at the same template location. If the actual number of bits per pixel is less than TBPP by a predetermined amount, then the QP value is decremented by one. The predetermined difference amount between the TBPP and actual number of bits per pixel, and the amount of increment or decrement of QP, are determined to achieve a desired performance level based on the given configuration. There are many other methods for adjusting QP on a real-time basis from frame to frame. In one periodic programmable embodiment, the entire template 300 is updated periodically, such as after a predetermined number of frames (e.g., after every 10 frames) and the update is performed for any number of frames (e.g., 1 or more frames).

The template 300 provides a more accurate determination or estimate of QP as compared to the template 200. The template 200 is based on the relative similarity of video content from one frame to the next, so that the QP values may become obsolete after a number of frames or in the event of a significant change of video content (e.g., scene change). The template 300, however, is based on complexity information of the frame and the estimate is further adjusted by the TBPP value. The information does not become obsolete over time as quickly as with the template 200; nonetheless, the QP values in the template 300 may further be updated or adjusted in real-time and/or on a periodic basis. In yet another embodiment, the template 300 is simplified by providing one QP value for each MAD value, thereby eliminating the TBPP variable. For example, in the template 301, a single QP value of 10 is provided for the MAD value of 256 regardless of the TBPP value, which is ignored in this embodiment. In this manner, the size of the template 300 is reduced and the operational complexity of the rate control logic is further simplified since TBPP need not be calculated, which further simplifies the index value $I_i$ used to retrieve the QP values from the template 300. Eliminating the TBPP value reduces complexity and simplifies processing at the expense of reduced accuracy of encoding results.

Figure 4:
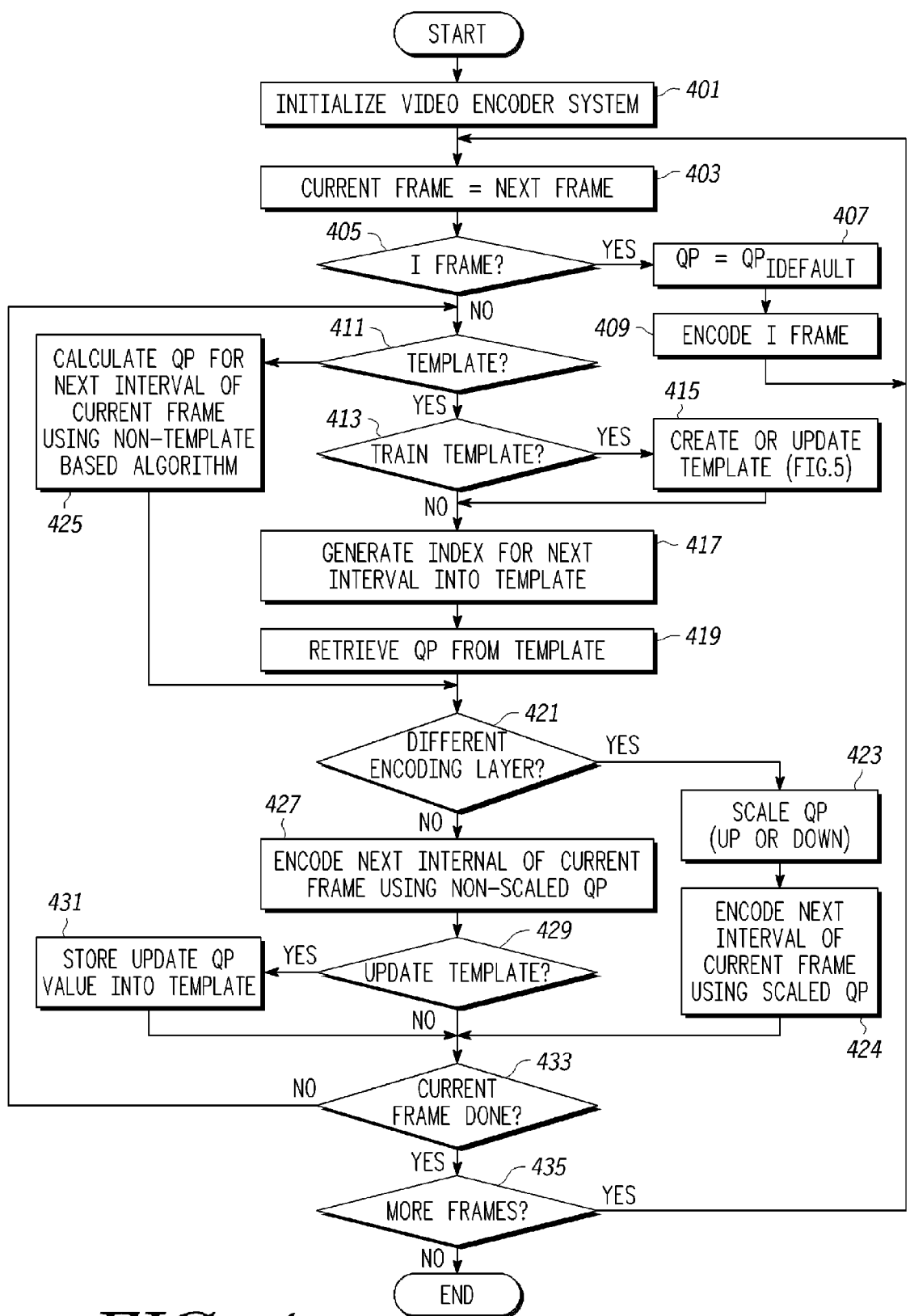
FIG. 4 is a flowchart diagram illustrating operation of the video encoder system of FIG. 1 according to an exemplary embodiment of the present invention.

FIG. 4 is a flowchart diagram illustrating operation of the video encoder system 100 according to an exemplary embodiment of the present invention. The particular flowchart diagram illustrated is exemplary only and may include fewer or additional blocks or steps in other embodiments, and the particular ordering of blocks may be rearranged for performing similar functions. At first block 401, the video encoder system 100 is initialized, such as at startup or reset or at the beginning of new video source information. Initialization may include, for example, setting various parameters to initial, default, or predetermined values. At next block 403, the "next" frame becomes the "current" frame, which is the first frame of the video source in the first iteration. At next block 405, it is queried whether the current frame is an I frame. The first frame is typically an I frame, so that operation proceeds to block 407 in the first iteration in which QP is initialized to an I frame default value $QP_{IDEFAULT}$. Thus, QP is preset to a default value for I frames and held constant for the entire I frame. It is noted that different bit rates and/or frame rates may have different values of $QP_{IDEFAULT}$, but the selected value is fixed for the entire I frame. At next block 409, the I frame is encoded by the video encoder 103 in its entirety using $QP_{IDEFAULT}$. After the I frame is encoded, operation returns to block 403 to advance to the next frame as the current frame, and then to block 405 to determine whether the next frame is an I frame. The next frame is usually not an I frame, so that operation advances instead to block 411. It is noted that during the video sequence, whenever an I frame is encountered, the steps 407 and 409 are performed to encode the I frame using the appropriate $QP_{IDEFAULT}$.

At block 411, it is queried whether the template 113 is used to provide a QP value. In one embodiment, the QP is determined solely by the template 113 without further modification except for a simple capping the deltaQP (the change of QP from one rate control interval iteration to next) into a narrow range. In another embodiment, the template 113 is used to provide an initial QP which is further scaled or modified as further described below. In yet another embodiment, the template 113 is created and populated with QP values and/or is periodically updated. In yet another embodiment, the template 113 is not used at all and the rate control logic 111 is configured to calculate QP. In yet another embodiment, operation switches between calculated QP values and template-based QP values for any predetermined or desired number of frames of each. If the template 113 is to be used, then operation proceeds to block 413 in which it is queried whether to train the template 113, which means that the template 113 is either created and populated with QP values or some or all of the stored QP values are updated. If the template is to be trained, operation proceeds to a training session at block 415 to either populate the template 113 with new values (template creation) or to update the existing values within the current template 113 (template update). In certain embodiments, the template 113 includes pre-stored information at initialization which may either be used immediately or updated based on training session results. In other embodiments, the template 113 has no information and must be initially trained during the training session to populate with QP values. The training session is described further with reference to FIG. 5.

If the template 113 is not to be trained as determined at block 413, operation proceeds to block 417 in which an index value $I_i$ is generated for the template 113 for accessing the next QP for the next interval of the current frame. The form of the index value $I_i$ is determined according to the type of template 113, such as according to either of the templates 200 or 300 as previously described. The generated index value $I_i$ is used to retrieve the next QP from the template 113 at block 419. Referring back to block 411, if the template 113 is not to be used as determined at block 411, operation proceeds instead from block 411 to block 425 in which the QP value is calculated (rather than retrieved from the template 113) for encoding the next interval of the current frame using any suitable non-template based quantization parameter determination algorithm, such as any conventional or newly developed QP algorithm.

After the QP value is calculated or retrieved from the template 113, operation proceeds to next block 421 in which it is queried whether the video encoder 103 is encoding at a different layer as compared to the operational layer (e.g., base layer) for which the stored QP values were configured or for which the calculated QP was determined. It has been determined, based on rate-distortion statistical data, that as an encoded video sequence is scaled in any one or more of bit rate, spatial resolution and temporal resolution, or any other encoding layer metric or parameter, the QP for one encoding layer can be predicted or otherwise calculated from the QP provided for a different encoding layer. In one embodiment, the QP values are suitable for a predetermined base layer encoding and are scaled for the corresponding enhanced layer encoding (i.e., for an increase of any of the encoding layer parameters) if the video encoder 103 is operating at the enhanced layer. In one embodiment, the values stored in the template 113 are appropriate for a predetermined base layer encoding and are thus scaled for enhanced layer encoding. The base layer encoding is the lowest performance level for a given embodiment. For example, in one configuration the base layer encoding is a spatial resolution of QCIF at a temporal resolution of 30 fps at a bit rate of 64 kbps. Enhanced layer encoding occurs for an increase in any one or more of spatial resolution (e.g., CIF), temporal resolution (e.g., 45 fps), or bit rate (e.g., 128 kbps). It is noted, however, that the definition of the base layer may be different from one configuration to the next (e.g., determined by any combination of the encoding layer parameters, including spatial resolution, temporal resolution, bit rate and/or any other encoding layer parameters), and that scaling is bidirectional so that scaling may be performed from any one layer to another (e.g., from higher to lower or vice-versa or otherwise between different layers depending upon the relative changes of the encoding layer parameters). In this manner, the calculated or template-based QP values may be based on any layer, such as, for example, a mid-level layer, rather than a predetermined base layer, and may then be scaled to any other layer being used by the video encoder 103.

If the QP value is to be scaled for a different layer encoding as determined at block 421, operation proceeds to block 423 to scale QP from one encoding layer to another. Such scaling is performed by the QP scaling logic 112 previously described and is between different encoding layers. In an alternative embodiment, scaling may be tabulated as a function of the encoding layer parameter and a scaling offset. Assuming the calculated QP is a lower layer QP ($QP_{LOWER\_LYR}$), or that the QP values stored in the template 113 are lower layer QP values, then, assuming otherwise fixed spatial and temporal resolutions, the bit rate is scaled from a $QP_{LOWER\_LYR}$ value to a higher layer QP value, or $QP_{HIGHER\_LYR}$, according to the following equation (2):

$$QP_{HIGHER\_LYR} = QP_{LOWER\_LYR} - K_1 LOG_2 \frac{BITRATE_{HIGHER\_LYR}}{BITRATE_{LOWER\_LYR}} \quad (2)$$

where $K_1$ is a predetermined constant experimentally determined, $BITRATE_{HIGHER\_LYR}$ is the bit rate (e.g., in kbps) for the higher layer encoding and $BITRATE_{LOWER\_LYR}$ is the bit rate (e.g., in kbps) for the lower layer encoding. In one embodiment, $K_1$ is 5. As an example, assuming that $QP_{LOWER\_LYR}=40$ for the lower layer operation of QCIF at a temporal resolution of 30 fps at a bit rate of 64 kbps, and the video encoder system 100 is operating at 256 kbps, then using equation (2) for $K_1=5$, $QP_{HIGHER\_LYR}=30$ (or $40-5*LOG_2[BITRATE_{HIGHER\_LYR}/BITRATE_{LOWER\_LYR}=4]$, and $LOG_2[4]=2$). It is noted that as the bit rate is increased from the higher layer to a lower layer assuming spatial and temporal resolutions are the same, the QP value is decreased which reduces the quantization step size of transformation coefficients, thereby increasing the quality of the video sequence.

At block 423, the temporal resolution is scaled according to the following equation (3):

$$QP_{HIGHER\_LYR} = QP_{LOWER\_LYR} + K_2 LOG_2 \frac{FRAMERATE_{HIGHER\_LYR}}{FRAMERATE_{LOWER\_LYR}} \quad (3)$$

where $K_2$ is a predetermined constant experimentally determined, $FRAMERATE_{HIGHER\_LYR}$ is the frame rate (e.g., in fps) for the higher layer operation and $FRAMERATE_{LOWER\_LYR}$ is the frame rate (e.g., in fps) for the lower layer operation. In one embodiment, $K_2$ is 5. It is noted that as the frame rate is increased from the lower layer to a higher layer while the bit rate and the frame resolution both remain the same, the QP value is increased which increases the quantization step size of transformation coefficients, thereby decreasing the quality of the video sequence.

Also at block 423, the spatial resolution is scaled according to the following equation (4):

$$QP_{HIGHER\_LYR} = QP_{LOWER\_LYR} + K_3 LOG_2 \frac{FRAMERES_{HIGHER\_LYR}}{FRAMERES_{LOWER\_LYR}} \quad (4)$$

where $K_3$ is a predetermined constant experimentally determined, $FRAMERES_{LOWER\_LYR}$ is the frame resolution (e.g., pixel by pixel for luma) for the higher layer operation and $FRAMERES_{LOWER\_LYR}$ is the frame resolution (e.g., pixel by pixel for luma) for the lower layer operation. The spatial resolution of each frame, or FRAMERES, is provided as the square of the number of pixels of luma in each frame, or pixel by pixel for luma. For example, for QCIF with a frame size in pixels of 176×144 pixels, the FRAMERES is 25,344, and for CIF with a frame size in pixels of 352×288 pixels, the FRAMERES is 101,376, and so on. In one embodiment, $K_3$ is 3. It is noted that as the frame resolution is increased from the lower layer to an enhanced layer (or higher layer) while the bit rate and frame rate both remain the same, the QP value is increased which increases the quantization step size of transformation coefficients, thereby decreasing the quality of the video sequence.

It is appreciated that any combination of the equations (2)-(4) may be used to scale from one layer to another. For example, if both bit rate and frame rate are increased, then equations (2) and (3) are used to calculate the scaled QP value for the higher layer of operation. It is also appreciated that the inverse of any one or more of the equations (2), (3) and (4) is used to convert the QP value from a higher layer to a lower layer or back to the base layer. For example, if the template 113 stores values for QCIF at a temporal resolution of 30 fps at a bit rate of 128 kbps, then the inverse of equation (2) is used to convert the QP value from 128 kbps ($QP_{HIGHER\_LYR}$) to an appropriate scaled QP value ($QP_{LOWER\_LYR}$) for a new, lower bit rate of 64 kbps according to the following equation (5):

$$QP_{LOWER\_LYR} = QP_{HIGHER\_LYR} + K_1 LOG_2 \frac{BITRATE_{HIGHER\_LYR}}{BITRATE_{LOWER\_LYR}} \quad (5)$$

In this case, the $QP_{LOWER\_LYR}$ value is scaled to a greater value than the $QP_{HIGHER\_LYR}$ by the appropriate amount for the decreased bit rate. The inverse of equation (3) is according to the following equation (6):

$$QP_{LOWER\_LYR} = QP_{HIGHER\_LYR} - K_2 LOG_2 \frac{FRAMERATE_{HIGHER\_LYR}}{FRAMERATE_{LOWER\_LYR}} \quad (6)$$

The inverse of equation (4) is according to the following equation (7):

$$QP_{LOWER\_LYR} = QP_{HIGHER\_LYR} - K_3 LOG_2 \frac{FRAMERES_{HIGHER\_LYR}}{FRAMERES_{LOWER\_LYR}} \quad (7)$$

It is further appreciated that any combination of the equations (5)-(7) may be used to scale from a higher layer to a lower layer. And furthermore, any combination of the equations (2)-(7) are used to scale to any different layer. For example, if for any reason the bit rate is increased while the frame rate is decreased, then equation (2) is used for the increased bit rate and equation (6) is used for the decreased frame rate.

A combined scalability, in which the bit rate, frame rate and frame resolution are all increased, is determined according to the following equation (8):

$$QP_{HIGHER\_LYR} = QP_{LOWER\_LYR} + LOG_2 [(k1*BR_{RATIO})*(k2*FR_{RATIO})*(k3*RES_{RATIO})] \quad (8)$$

where $QP_{LOWER\_LYR}$ is the QP value for the lower layer, $QP_{HIGHER\_LYR}$ is the QP value for the higher layer, the constants, in one embodiment, are k1=−5, k2=5, k3=3, and where $BR_{RATIO}$=BITRATE$_{HIGHER\_LYR}$/BITRATE$_{LOWER\_LYR}$, $FR_{RATIO}$=FRAMERATE$_{HIGHER\_LYR}$/FRAMERATE$_{LOWER\_LYR}$, and $RES_{RATIO}$=FRAMERES$_{HIGHER\_LYR}$/FRAMERES$_{LOWER\_LYR}$.
And although not shown, an inverse of equation (8) may be used if the encoding layer parameters bit rate, frame rate and frame resolution are all decreased. It is also appreciated that equations for other encoding layer parameters may be used while remaining within the scope of the present invention.

Referring back to FIG. 4, after the QP value is scaled at block 423, operation proceeds to block 424 in which the next interval of the current frame is encoded using the scaled QP value for the different encoding layer, and then operation proceeds to block 433, described below. If the video encoder system is operating at the same layer for which the calculated or template-base QP was determined, then operation proceeds instead to block 427 in which the next interval of the current frame is encoded using the template or calculated QP value. At next block 429, it is determined whether to update the template 113 based on actual encoding results. As previously noted, for example, if the actual number of encoded bits per pixel is different from the TBPP value by a predetermined variation (e.g., ≧15%) for the template 300 configuration, then the QP value stored in the template 300 is incremented or decremented accordingly. It is appreciated, however, that many other techniques and methods may be used to adjust QP based on encoding results. If the template 113 is to be updated, operation proceeds to block 431 in which the updated QP value is stored at the appropriate location within the template 113.

After the new QP value is stored in the template 113 or after the base or enhanced interval is encoded, operation proceeds to block 433 in which it is queried whether encoding of the current frame is completed. If so, operation returns back to block 411 and operation loops until encoding of the current frame is complete. When the video encoder 103 is encoding at a different layer than the layer for which the calculated or template-based QP values were intended, operation loops from block 411 to block 421 and back to block 423 while the different layer encoding is active. When encoding of the current frame is complete, operation proceeds instead to block 435 in which it is queried whether there are more frames in the video sequence. If so, operation returns to block 403 and operation loops until encoding of the entire video sequence is complete. When encoding of the entire video sequence is completed, operation terminates or is suspended until another video sequence is provided from the video source 101.

Figure 5:
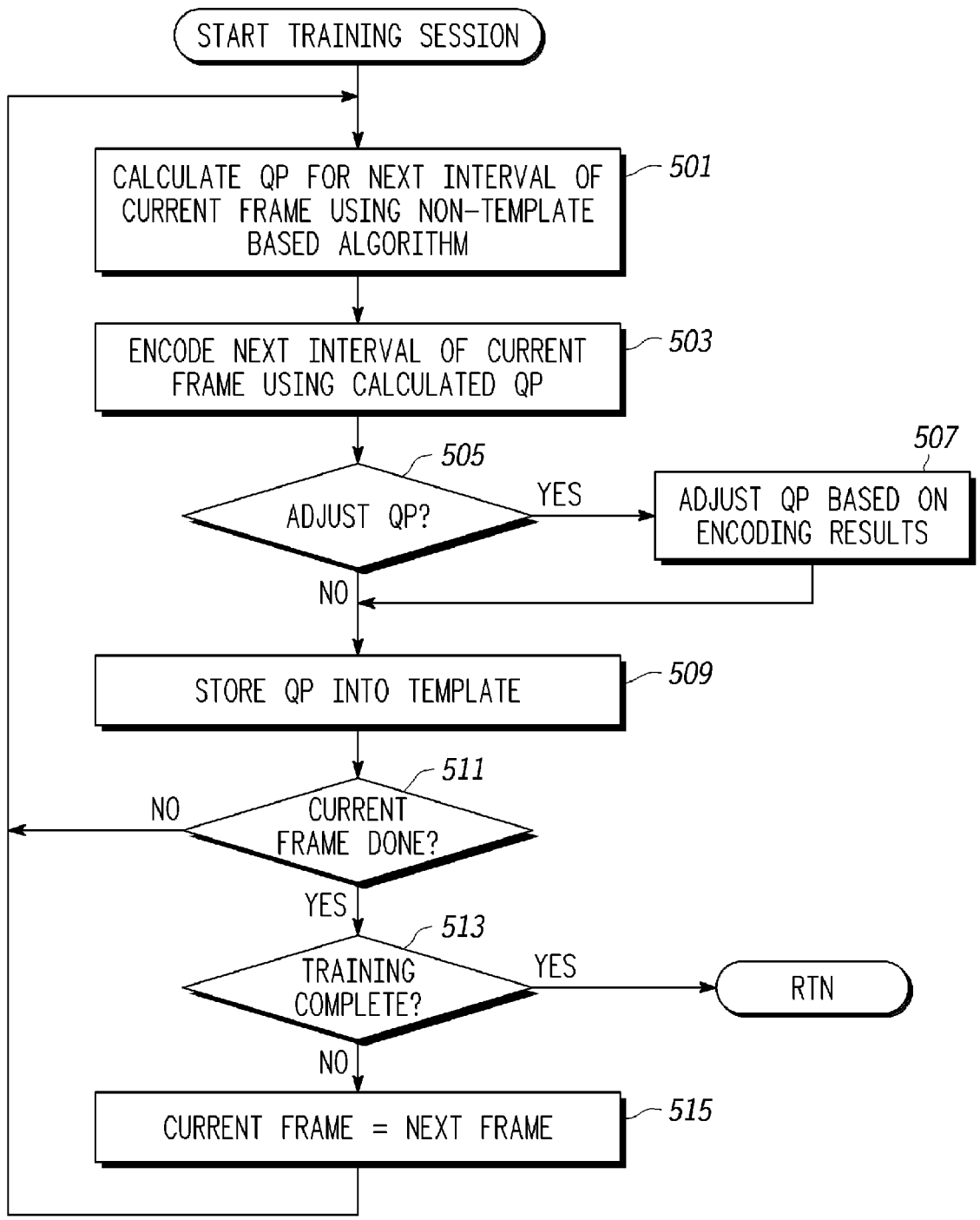
FIG. 5 is a flowchart diagram illustrating operation of the video encoder system 100 according to an exemplary embodiment of the present invention for training the template of FIG. 1.

FIG. 5 is a flowchart diagram illustrating operation of the video encoder system 100 according to an exemplary embodiment of the present invention for training the template 113. If the template 113 is to be trained as determined at block 413, operation proceeds to block 415 in which the template 113 is created or updated. At block 415, operation jumps to block 501 in which the QP value is calculated (rather than retrieved from the template 113) for encoding the next interval of the current frame using any suitable non-template based quantization parameter determination algorithm, such as any conventional or newly developed QP algorithm, similar to that described for block 425. At next block 503, the next interval of the current frame is encoded using the QP value calculated at block 501. At next block 505, it is queried whether to adjust the calculated QP based on encoding results. If so, operation proceeds to block 507 in which the QP value is adjusted based on encoding results to achieve a more accurate value. The calculated or adjusted QP is then stored within the template at next block 509. At next block 511, it is determined whether encoding of the current frame is done, and if not operation loops back to block 501 for calculating a new QP value for the next interval of the current frame during the training session. Otherwise, operation proceeds to block 513 in which it is queried whether the training session is complete. In one embodiment, such as a single-frame template 113, QP values are determined for only one frame and operation returns to block 417 previously described. If multiple frames are to be encoded during the training session, operation proceeds instead to block 515 in which the next frame becomes the current frame, and then operation loops back to block 501 to continue the training session. The training session is performed for as many frames as necessary or desired to create or update the template 113.

A rate control system for a video encoder according to an embodiment of the present invention includes rate control logic which determines a first quantization parameter (QP) corresponding to a selected encoding layer of multiple encoding layers, and scaling logic configured to scale the first QP to a second QP corresponding to any other encoding layer based on at least one encoding layer parameter.

In one embodiment, a template is included with multiple stored QP values corresponding to the selected encoding layer. In this case, the rate control logic retrieves the first QP from the stored QP values in the template. The template may be configured to store at least one video frame of information including a QP value for each rate control interval of a selected video frame. In this case, the rate control logic periodically performs a training session for calculating and storing a QP value for each interval of the selected video frame. Also, the rate control logic retrieves a corresponding stored QP value for each interval of at least one subsequent video frame (e.g., for the next 10 video frames in which training is conducted every 10 frames). In another template-based embodiment, the template stores at least one QP value for each of multiple rate control interval complexity values. In one rate control interval complexity-based embodiment, the rate control interval complexity values are mean of sum of absolute difference (MAD) values. In a more specific template embodiment, the template stores several QP values for each rate control interval complexity value, each QP value further corresponding to one of multiple target bits per pixel parameters.

The encoding layers may be based on selected ones of multiple encoding layer parameters, such as a corresponding bit rate, a corresponding temporal resolution, and a corresponding spatial resolution, although more or less encoding layer parameters may be employed. The scaling logic may be configured to convert the first QP to the second QP by converting between multiple bit rates, multiple temporal resolutions, and multiple spatial resolutions. In a more specific embodiment, the scaling logic converts to the second QP by adding a QP offset, where the QP offset is either determined based on any selected ones of a ratio of first and second bit rates, a ratio of first and second video frame rates, and a ratio of first and second video frame resolutions or tabulated as a function of the encoding layer parameter and a scaling offset. Also, the scaling logic may be configured to scale from any one encoding layer to another and vice-versa for bi-directional scaling capability.

A scalable video encoding system according to an embodiment of the present invention includes a video encoder which encodes video information based on a QP, system control logic which provides at least one target encoding layer parameter indicating a corresponding one of multiple encoding layers, and a rate control system which determines the QP corresponding to a selected encoding layer, and which is configured to scale the QP to correspond to any other encoding layer based on the target encoding layer parameter.

The encoding layers may be based on any one or more of multiple encoding layer parameters of the video information, such as a selected bit rate, a selected temporal resolution, and a selected spatial resolution. The rate control system may be configured to scale the QP based on multiple bit rates, multiple temporal resolutions, and multiple spatial resolutions. The rate control system may be configured to add a QP offset to the QP, where the QP offset is determined based on any selected ones of a ratio of first and second bit rates, a ratio of first and second video frame rates, and a ratio of first and second video frame resolutions.

The rate control system may include a template which stores multiple QP values, each corresponding to a selected encoding layer (e.g., a base layer), and scaling logic, which is configured to scale the QP to correspond to any other encoding layer based on the one target encoding layer parameter. The rate control system may be configured to conduct a training session to program the template with a QP value for each rate control interval of a selected video frame. Alternatively, each of the stored QP values may correspond to one of multiple frame complexity values. In a more specific configuration, the video encoder provides a frame complexity value and pixel encoding information after encoding each interval of a video frame, where the rate control system updates the template based on the frame complexity value and the pixel encoding information.

A method of scaling a QP for video encoding according to an embodiment of the present invention includes determining a first QP corresponding to a selected one of multiple encoding layers, receiving multiple encoding parameters indicating a second encoding layer, and scaling the first QP to a second QP which corresponds with the second encoding layer. The method may include retrieving a QP value from a template of pre-stored QP values. The method may include receiving a target bit rate, a target frame rate, and a target frame resolution. The method may include adding a QP offset based on a change of at least one of bit rate, frame rate and frame resolution.

Although the present invention has been described in considerable detail with reference to certain preferred versions thereof, other versions and variations are possible and contemplated. Finally, those skilled in the art should appreciate that they can readily use the disclosed conception and specific embodiments as a basis for designing or modifying other structures for carrying out the same purposes of the present invention without departing from the spirit and scope of the invention as defined by the appended claims.

What is claimed is:

1. A rate control system for a video encoder, comprising:
a template comprising a plurality of predetermined and pre-stored quantization parameter (QP) values corresponding to a selected one of a plurality of encoding layers, wherein said template stores a plurality of QP values including at least one QP value for each of a set of motion complexity values each indicative of relative motion in which said plurality of motion complexity values range from low motion to high motion;
rate control logic which determines a new motion complexity value for each new rate control interval and which uses said new motion complexity value as an index to retrieves a first QP value from said template; and
scaling logic configured to scale said first QP value corresponding to said selected encoding layer to a second QP value corresponding to any other one of said plurality of encoding layers based on at least one encoding layer parameter.

2. The rate control system of claim 1, wherein said rate control logic periodically performs a training session for calculating and storing a QP value for each interval of a selected video frame, and wherein said rate control logic retrieves a corresponding stored QP value for each interval of at least one subsequent video frame.

3. The rate control system of claim 1, wherein said template stores at least one QP value for each of a plurality of rate control interval complexity values.

4. The rate control system of claim 3, wherein said plurality of rate control interval complexity values comprises a plurality of mean of sum of absolute difference values.

5. The rate control system of claim 3, wherein said template stores a plurality of QP values for each of said plurality of rate control interval complexity values, wherein each of said plurality of QP values further corresponds to one of a plurality of target bits per pixel parameters.

6. The rate control system of claim 1, wherein each of said plurality of encoding layers is based on a plurality of encoding layer parameters, including a corresponding bit rate, a corresponding temporal resolution, and a corresponding spatial resolution.

7. The rate control system of claim 6, wherein said scaling logic is configured to convert said first QP value to said second QP value by converting between a plurality of different bit rates, a plurality of different temporal resolutions, and a plurality of different spatial resolutions.

8. The rate control system of claim 7, wherein said scaling logic converts said first QP value to said second QP value by adding a QP offset, and wherein said QP offset is determined based on any selected ones of a ratio of first and second bit rates, a ratio of first and second video frame rates, and a ratio of first and second video frame resolutions.

9. The rate control system of claim 1, wherein said scaling logic is configured to scale from any one of said plurality of encoding layers to any other one of said plurality of encoding layers and vice-versa.

10. A scalable video encoding system, comprising:
a video encoder which encodes video information based on a quantization parameter (QP);
system control logic which provides at least one target encoding layer parameter indicating a corresponding one of a plurality of encoding layers; and
a rate control system which determines said QP corresponding to a selected one of said plurality of encoding layers, comprising:

a template which stores a plurality of predetermined and pre-stored QP values corresponding to said selected one of said plurality of encoding layers, wherein said template stores a plurality of QP values including at least one QP value for each of a set of motion complexity values each indicative of relative motion in which said plurality of motion complexity values range from low motion to high motion;

rate control logic which calculates a new complexity value for each new rate control interval and which uses said new complexity value to retrieve a corresponding QP value from said template; and scaling logic which is configured to scale said QP value retrieved from said template to correspond to any other one of said plurality of encoding layers based on said at least one target encoding layer parameter.

11. The scalable video encoding system of claim 10, wherein each of said plurality of encoding layers is based on a selected bit rate, a selected temporal resolution, and a selected spatial resolution of said video information.

12. The scalable video encoding system of claim 11, wherein said rate control system is configured to scale said QP value based on a plurality of different bit rates, a plurality of different temporal resolutions, and a plurality of different spatial resolutions.

13. The scalable video encoding system of claim 12, wherein said rate control system is configured to add a QP offset to said QP value, and wherein said QP offset is determined based on any selected ones of a ratio of first and second bit rates, a ratio of first and second video frame rates, and a ratio of first and second video frame resolutions.

14. The scalable video encoding system of claim 10, wherein said rate control system conducts a training session to program said template with a QP value for each rate control interval of a selected video frame.

15. The scalable video encoding system of claim 10, wherein each of said plurality of QP values stored in said template corresponds to one of a plurality of frame complexity values.

16. The scalable video encoding system of claim 15, wherein said video encoder provides a frame complexity value and pixel encoding information after encoding each interval of a video frame, and wherein said rate control system updates said template based on said frame complexity value and said pixel encoding information.

17. A method of scaling a quantization parameter (QP) for video encoding, comprising:

determining a first QP corresponding to a selected one of a plurality of encoding layers comprising retrieving a QP value from a template of predetermined and pre-stored QP values, wherein the template stores a plurality of QP values including at least one QP value for each of a set of motion complexity values each indicative of relative motion in which said plurality of motion complexity values range from low motion to high motion;

receiving a plurality of encoding parameters indicating a second one of the plurality of encoding layers; and scaling the first QP to a second QP which corresponds with the second one of the plurality of encoding layers.

18. The method of claim 17, wherein said receiving a plurality of encoding parameters comprises receiving a target bit rate, a target frame rate, and a target frame resolution.

19. The method of claim 17, wherein said scaling the first QP to a second QP comprises adding a QP offset based on a change of at least one of bit rate, frame rate and frame resolution.

* * * * *